(No Model.)   10 Sheets—Sheet 1.

A. H. HUTH.
TYPE WRITING MACHINE.

No. 525,345.   Patented Sept. 4, 1894.

Fig. 1.

Witnesses
B. H. Miller
Baltus DeLong

Inventor.
Alfred Henry Huth
By his Atty's
Baldwin Davidson & Wight (No Model.) 10 Sheets—Sheet 3.

A. H. HUTH.
TYPE WRITING MACHINE.

No. 525,345. Patented Sept. 4, 1894.

Fig. 3.

Witnesses
B. W. Miller
Baltus De Long

Inventor
Alfred Henry Huth
By his Atty's
Baldwin Davidson Wight (No Model.) 10 Sheets—Sheet 5.
A. H. HUTH.
TYPE WRITING MACHINE.

No. 525,345. Patented Sept. 4, 1894.

Witnesses.
B. W. Miller.
Baltus DeLong.

Inventor.
Alfred Henry Huth,
By his Atty's.
Baldwin, Davidson & Wight.

(No Model.)　　　　　　　　　　　　　　　　　　　10 Sheets—Sheet 6.
A. H. HUTH.
TYPE WRITING MACHINE.

No. 525,345.　　　　　　　　　　　　Patented Sept. 4, 1894.

(No Model.)  
10 Sheets—Sheet 7.

A. H. HUTH.
TYPE WRITING MACHINE.

No. 525,345. Patented Sept. 4, 1894.

Witnesses.
B. W. Miller
C. W. Brooke

Inventor.
Alfred Henry Huth.
By his Attorneys
Baldwin Davidson & Wight

(No Model.) 10 Sheets—Sheet 9.
A. H. HUTH.
TYPE WRITING MACHINE.

No. 525,345. Patented Sept. 4, 1894.

Witnesses.
B. W. Miller
Baltus DeLong

Inventor.
Alfred Henry Huth
By his Att'ys
Baldwin Davidson & Wight (No Model.) 10 Sheets—Sheet 10.

A. H. HUTH.
TYPE WRITING MACHINE.

No. 525,345. Patented Sept. 4, 1894.

UNITED STATES PATENT OFFICE.

ALFRED HENRY HUTH, OF LONDON, ENGLAND.

TYPE-WRITING MACHINE.

SPECIFICATION forming part of Letters Patent No. 525,345, dated September 4, 1894.

Application filed July 3, 1893. Serial No. 479,499. (No model.)

*To all whom it may concern:*

Be it known that I, ALFRED HENRY HUTH, esquire, a subject of the Queen of Great Britain, residing at Bolney House, Ennismore Gardens, London, England, have invented certain new and useful Improvements in Type-Writers, of which the following is a specification.

This invention relates to the class of typewriters in which each type is carried by a separate hammer.

One of the objects of the invention is to be able to use a larger number of hammers than is commonly provided in such machines. This I do by ranging the pivots or fulcra of the hammers in two parallel nearly semicircular groups and yet so that the type carried by every hammer may print at the same central spot.

Another object of the invention is to obtain a more perfect inking of the type; this I do by providing a separate inking roller for each type. I mount the inking roller upon a slide which transmits the movement of the finger key to the hammer. During the first part of the movement of the finger key the type hammer remains at rest and the slide carries the inking roller over the face of the type. While the hammer is in movement the inking roller passes to and fro over a surface of felt or other material from which it receives the ink.

Another part of the invention has for its object to obtain a better spacing of the letters, giving to each letter the room which it naturally requires. I prefer to provide for spacing in four different grades and for this purpose I provide in the base of the machine four pivoted spacing frames.

Each finger key by means of a projection upon it gives movement to one or other of the spacing frames according to the space required by the letter to which the key corresponds. The sheet of paper to be printed is carried upon a roller mounted in a paper carriage; a spring tends to draw the carriage forward but it is retained by a pinion engaged with a rack fixed to the paper carriage. The pinion itself is prevented from turning by a retaining pawl entering the teeth of a ratchet. There are other ratchet wheels fixed to the pinion and to work in connection with these other pawls and pawl carriers are provided. The movement of either of the spacing frames results in disengaging the retaining pawl; also in causing the corresponding pawl carrier to advance and to insert its pawl between the teeth of the ratchet wheel. Now the pawl on the pawl carrier has a certain pre-arranged freedom of motion in relation to the distance which the paper carriage should advance. By this pawl therefore the paper carriage is allowed to move forward a distance and is then stopped. Just as the paper carriage is stopped the retaining pawl is allowed to return so that the pawl carrier may fall back without releasing the carriage.

To cause the advance of the paper carriage I do not rely entirely on a spring as in rapid working the carriage might fail to move with sufficient promptitude. I insure prompt movement by providing a lever moved by the spacing frames and armed with a driving pawl which engages with another ratchet wheel upon the axis of the pinion.

The driving pawl and the retaining pawl are so connected that as the one goes out of engagement the other comes in.

In order that my invention may be fully understood I will proceed to describe the annexed drawings.

Fig. 6$^a$ shows in plan one of the type hammers with its slide and the bell crank which actuate them in the position of rest. Fig. 6$^b$ shows the same parts in the position they occupy momentarily in striking the blow upon the paper. Figs. 6$^c$ and 6$^d$ show the bell crank in elevation and in corresponding positions.

1, 1 are the finger keys which actuate the printing hammers; they are rigidly connected by stems 2 with levers 3. These levers are kept properly spaced by a comb $c$ and are all mounted on the horizontal rod or axis 4 and this is fixed and extends transversely across the framing of the machine. Each key lever is supported by a spring $3^x$ and is connected by a rod 5 with a bell crank lever 6.

The rods 5 are in each case furnished with right and left screw couplings 7 by the aid of which the length of the rod can be accurately adjusted; a few only of these couplings are shown.

Figures 7, 8, 9:
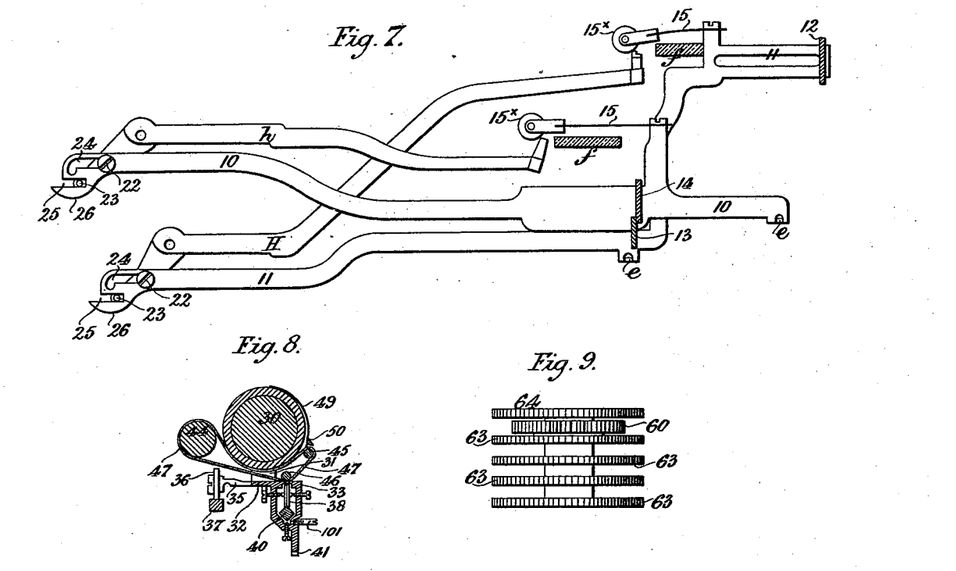
Fig. 7 shows full size in their proper relative positions two of the type hammers and the sliders which actuate them.
Fig. 8 is a transverse section of the paper carriage, half size.
Fig. 9 is a plan full size and shows wheels connected with the movement and control of the paper carriage for letter spacing.
Figure 10:
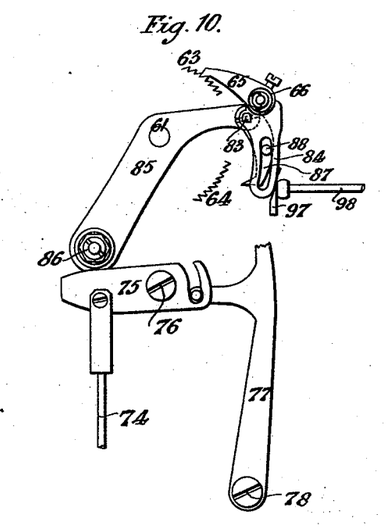
Fig. 10 is an elevation of part of the letter spacing mechanism.
Figure 11:
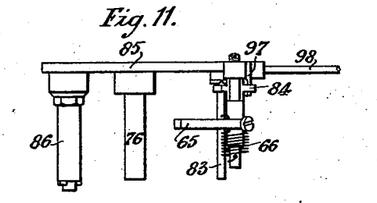
Fig. 11 is a plan of some of the parts.
Figures 12, 13:
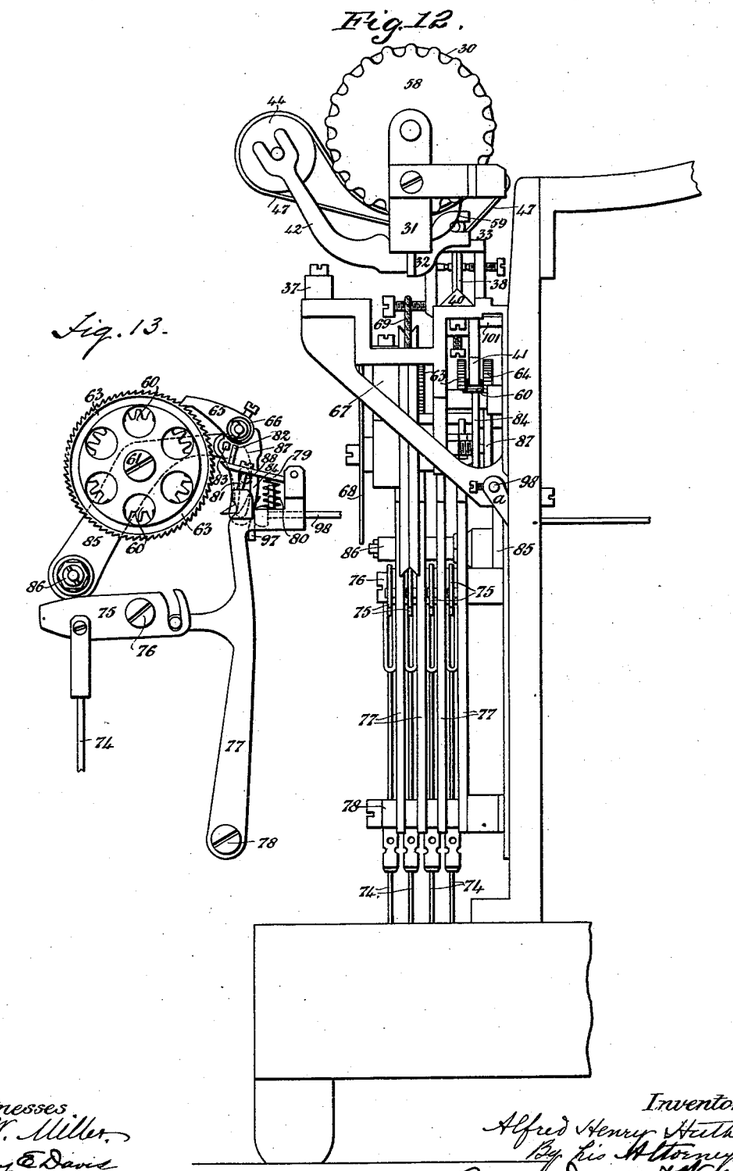
Fig. 12 is a detail view on an enlarged scale, of the spacing and paper feeding mechanism.
Fig. 13 is a detail view on an enlarged scale of other parts of this mechanism.

The bell crank levers 6 are divided into two sets and each set is carried by a nearly semicircular bar fixed to the frame of the machine; these bars are marked 8 and 9 respectively. The fulcrum of each bell crank lever is upon a small cock or bearing piece which is separately attached to one or other of the bars 8 or 9. The farther end of each bell crank lever carries a pin which projects into an elongated eye formed upon a slide which consequently partakes of the movement of the finger key and bell crank. The slides also are divided into two sets marked 10 and 11 respectively corresponding to the front set of bell cranks on the bar 8 and the back set of bell cranks on the bar 9. The slides work in semicircular combs or guides fixed to the frame. There are several of these combs or guides; first there is the semicircular guide plate 12 which is perforated to receive the front ends of the slides 11. These slides are also guided by the comb 13; they lie in the radial notches on its outer circumference. The same comb 13 also has notches on its inner circumference and these notches which fall intermediate between the notches on its inner circumference receive the set of slides marked 10. 14 is another guide comb through which the slides 10 also work; it is fixed to the comb 13 and the notches being on the outer circumference the one comb serves to retain the slides in the notches of the other. The slides 10 and 11 are somewhat differently formed as is shown by Fig. 7 but in each case the rear end of the slide is connected by a peculiar joint with the shaft of the printing hammer. In each case also the slide is provided with a spring arm 15 having a forked head in which a small inking roller $15^x$ is mounted.

H $h$ are the hammers. Fig. 7 shows clearly the way in which the hammers and slides lie when at rest; the hammers H of the outer set passing between those of the inner set to come within reach of their inking rollers and the hammers $h$ of the inner set retiring between the hammers of the outer set to reach their ink rollers. This contrivance admits of the inking arrangements for the one set of hammers being placed out of the way of the other set of hammers. All of the slides employed in the machine are of one or the other of the forms shown in Fig. 7 excepting a slight difference in the position of the eye $e$ which receives the pin projecting from the bell crank. The bell cranks differ only in the length of the pin which engages the eye of the slide. The type hammers are all of one or the other of the forms shown in Fig. 7.

The division into two sets of the bell cranks, the slides and the type hammers, is with the object of gaining space, it permits of the use of many more type hammers than could otherwise be arranged to strike at the same point.

The hammers are carried by the two semicircular bars 16 and 17 and their heads when at rest lie on supporting bars 18 and 19. The shorter hammers are carried by the inner bar 16 and the longer hammers by the outer bar 17; so that the type with which the free end of each hammer is armed may, when the hammer is actuated by its finger key, strike truly at the central point.

Each hammer has its fulcrum upon a separate cock or bearing piece which is fixed by a screw to one or other of the supporting bars 16 or 17. There are also two semicircular bars 20 and 21 fixed to the frame and to these a strip of felt $f$ is attached which is saturated with the ink intended to be applied to the face of the type.

Each type hammer near its fulcrum has a short arm projecting from it carrying two pins 22 and 23 which enter slots 24 and 25 in the rear end of the corresponding slide. The arrangement is such that during the first part of the forward movement of the slide, the hammer is not moved but the inking roller $15^x$ on the slide passes over the face of the type upon the hammer and applies ink to it. Afterward the pin 22 arrives at the end of the slot 24 and then the hammer partakes of the movement of the slide and finger key and the type is thrown forward into contact with the paper. The paper is carried by a paper carriage as hereinafter described. When the pin 22 comes to the rear end of the slot 24, the other pin 23 on the same hammer has escaped from the open end of the slot 25. Directly the hammer commences to be moved by the slide, the pin 23 passes to the exterior of the curved horn 26 of the slide, and the pin 22 is thereby compelled to enter the curved end or outward prolongation of the slot 24. Thus the slide and the hammer become locked together so that as the finger key rises again by the action of the spring $3^x$ and the slide moves rearward, the pin 22 is also thrust back and the hammer is made to return to its original position. As the hammer returns the inking roller $15^x$ again passes over the face of the type and in the meantime it has traveled to and fro over the ink saturated felt f on the bar 20 or 21.

It will be observed that the pivoted type hammers have their fulcra arranged in two series occupying concentric arcs in different horizontal planes, (the one arc exterior to the other,) and the shafts of the hammers of one series cross the shafts of the hammers of the other series.

The sheet of paper to receive the impressions of the type is lapped partially around an india rubber covered roller 30 which with other parts of the paper carriage is shown in section by Fig. 8. The axis of this roller is received at its ends into bearings in standards 31 upon a bar 32 which passes beneath the roller from end to end. The bar has two arms 33 and 34 projecting forward from it and a single arm 35 projecting to the rear. The latter arm simply carries a wheel 36 which rests upon the bar or rail 37 and supports the carriage. The arms 33 and 34 also carry wheels 38 and 39 which bear upon the angle of the bar or guide rail 40; they also aid in supporting the carriage which is able to travel along the guide rails 37 and 40. The arms 33 and 34 are so made as to embrace the guide rail 40 and are provided with adjusting screws so that the carriage cannot rise from the rail. The arms 33 and 34 also carry a tooth rack 41 which is fixed to the arms.

Upon the paper carriage and fixed to the bar 32 are two arms 42 and 43, they project rearward and carry the axis of a small wooden roller 44. There are also two other shorter arms projecting forward from the front face of the bar 32 and these carry the metal rods 45 and 46. Endless india rubber bands 47 encircle the small roller 44 and pass beneath the paper roller 30. The upper surfaces of the bands 47 lie in contact with the under side of the paper roller (except when the sheet of paper to be printed is interposed) and the bands return beneath the rods 45 and 46. When the paper roller turns the bands 47 also travel moving together with the surface against which they lie. The paper to be printed is entered at the back of the paper carriage between the rollers 30 and 44 and the roller 30 being turned, by means of the milled head 48 upon the end of its axis, the paper passes on under the paper roller and then rising in front of it, is retained by the spring fingers 49, 49 which are attached to a bar 50 extending along the front of the paper roller from the standard at one end to that at the other end. The axis of the paper roller projects at one end and at this end it is supported by two standards 31. Between the two standards at this end of the carriage a beveled toothed wheel 51 is fixed upon the axis of the paper roller and it gears with a corresponding beveled pinion 52. The pinion 52 is fast with the star wheel 53 and both can turn together upon a cock 54 fixed upon the bottom bar 32 of the paper carriage. These wheels serve to rotate the paper roller in order to automatically move the paper forward to space the successive lines of printing. To effect this a small bracket piece 55 is mounted upon the guide rail 37 and pivoted on the bracket piece there is the finger 56, it is weighted at one end so that it assumes the position in which it is shown, a stop 57 upon the finger preventing the weighted end from descending lower. In the course of printing the paper carriage is caused as hereinafter explained to travel from right to left (as seen from the front) and during this travel one of the teeth of the star wheel 53 comes against the finger 56; the finger however yields and the tooth passes on without any further action. When however the carriage is drawn back by hand prior to commencing another line of printing, the finger 56 cannot yield and the tooth of the wheel 53 has to give way with the result that the star wheel and the paper roller are both turned partly round and the required advance of the paper is made.

The foot of the bracket 55 projects horizontally and enters a corresponding hole $55^\times$ in the guide rail 37. More than one hole is provided as it may sometimes be convenient to alter the position of the finger. In order to space the lines widely two fingers 56 may be employed one to act immediately after the other. At the farther end of the paper roller a notched wheel 58 is fixed upon the axis and a spring pawl 59 fixed to the bar 32 engages with it but allows one tooth to pass each time that a finger operates.

The rack bar 41 attached to the carriage engages with a pinion 60 on a stud axis 61 fixed upon the plate 62 which is secured to the framing of the machine. The pinion 60 is fast with a series of ratchet wheels shown separately in plan by Fig. 9.

Figure 1:
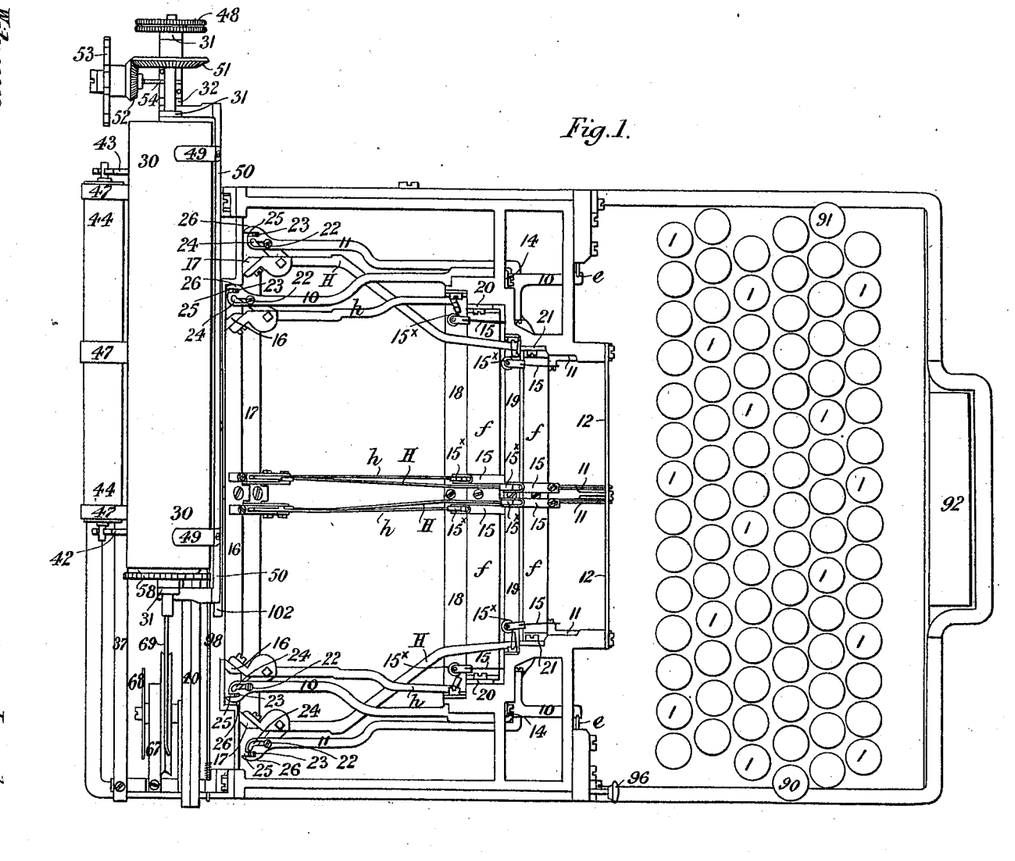
Figure 1 is a plan of the machine.
Figure 2:
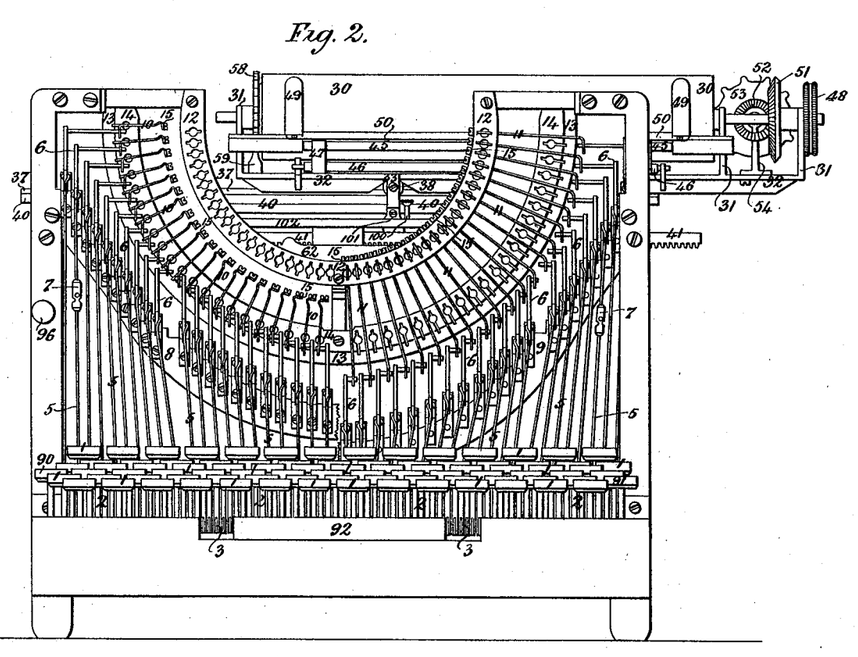
Fig. 2 is a front elevation.
Figure 3:
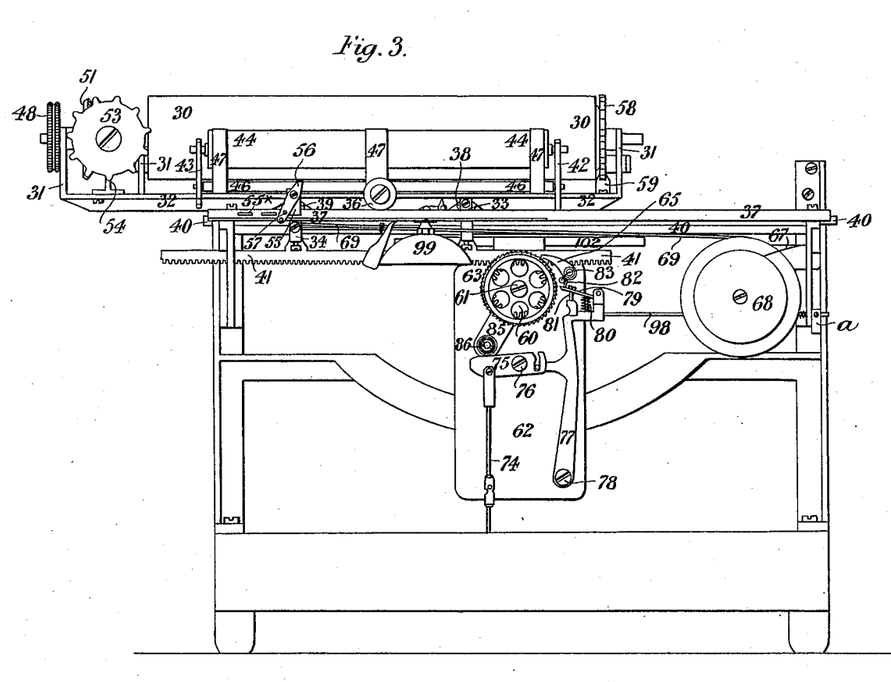
Fig. 3 is a rear elevation.
Figure 4:
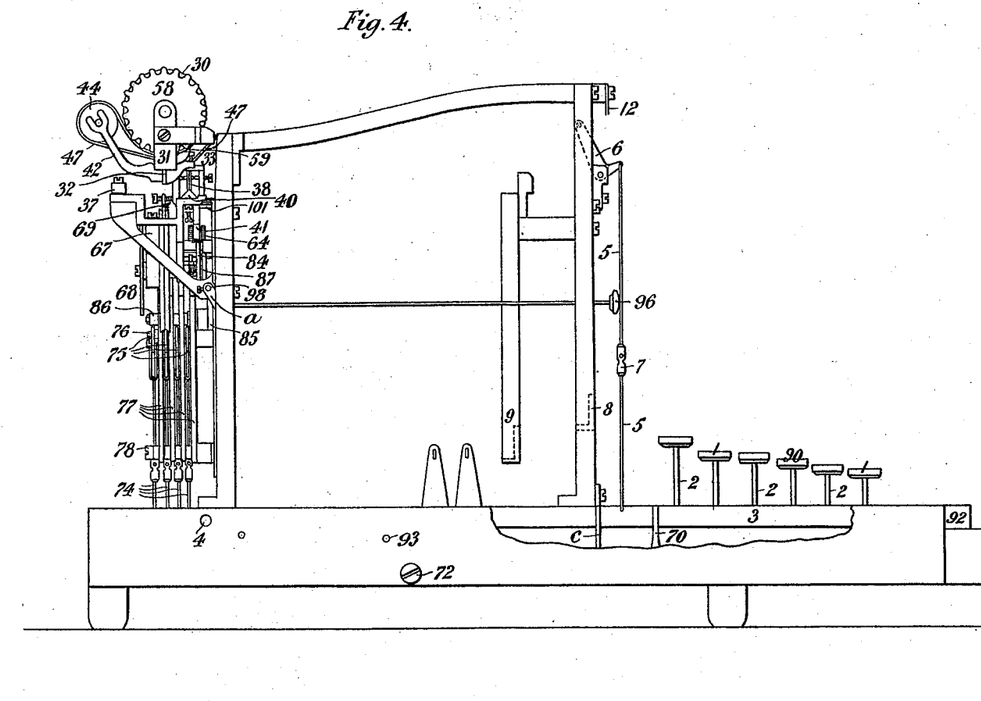
Fig. 4 is a side elevation.
Figure 5:
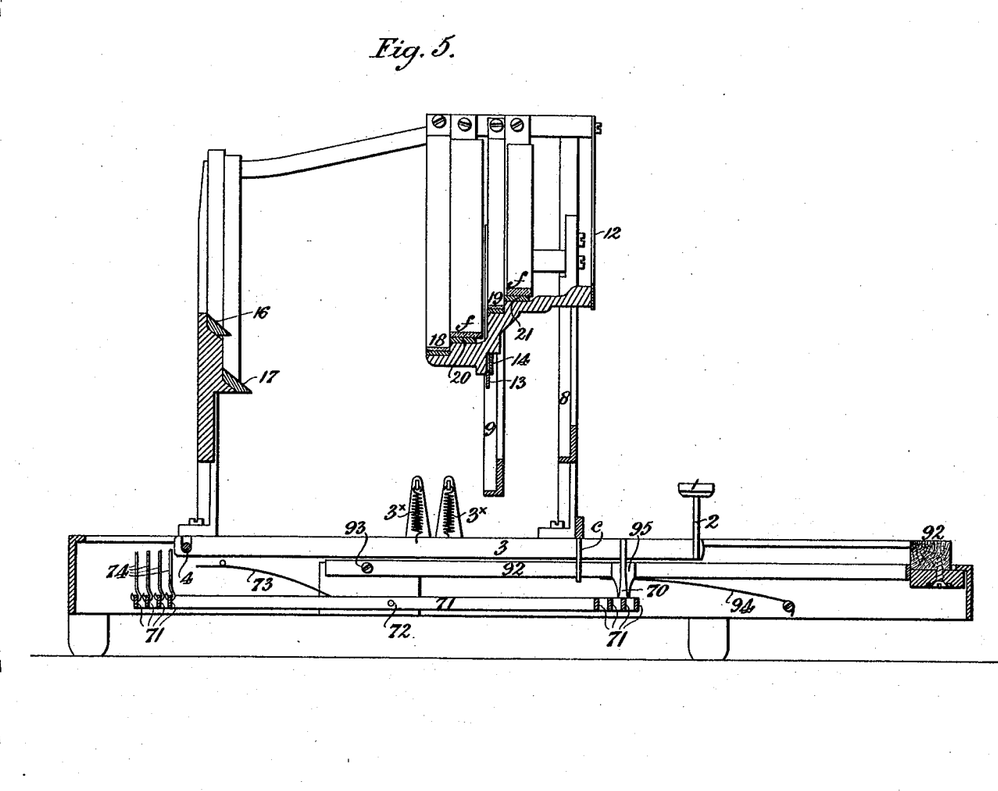
Fig. 5 is a longitudinal vertical section of the framing and a few of the moving parts.
Figure 6:
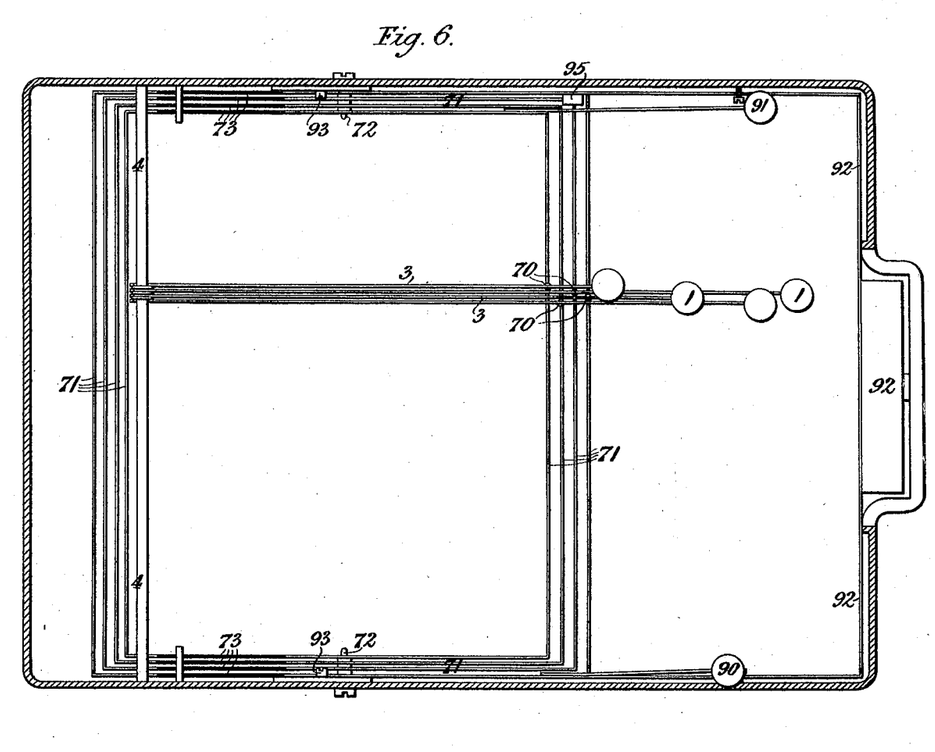
Fig. 6 is a horizontal section of the lower part of the machine with the upper parts all except a few of the finger keys removed. These figures are drawn to a scale of one half the actual size, and to avoid confusion in each of the figures some of the parts are removed.
Figure 6A:
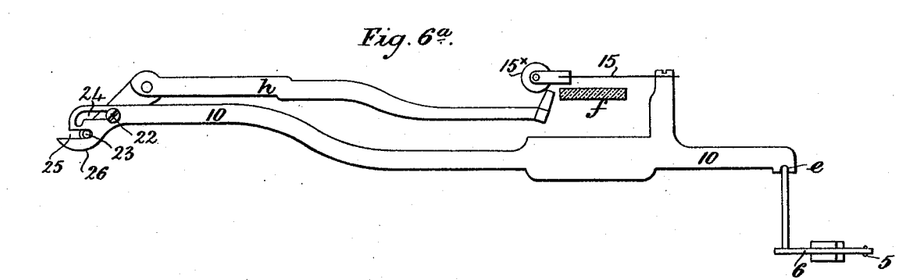
Figure 6B:
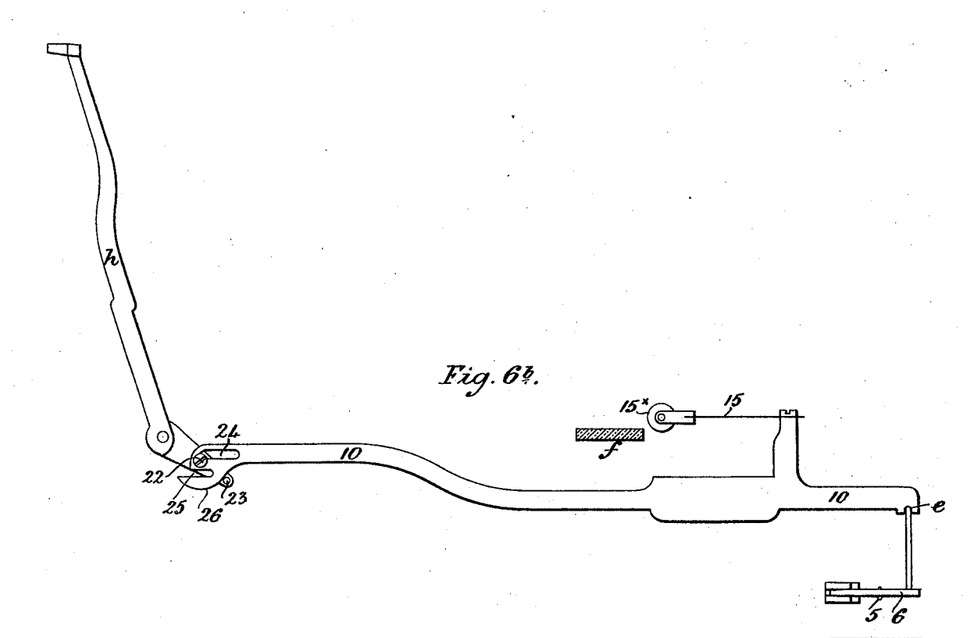
Figure 6C:
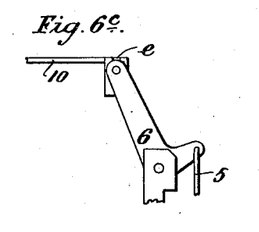
Figure 6D:
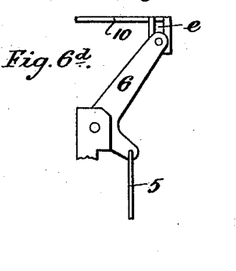

The four wheels marked 63 are all alike and may be regarded as one; the wheel 64 has the same number of teeth but they are inclined the opposite way. A pawl 65 is caused by a spring 66 to engage with one of the wheels 63 and normally prevents the paper carriage moving forward under the influence of a coiled spring 67 which is attached by one end to the framing of the machine and at the other to the periphery of a barrel 68. An arm projecting from the framing carries this barrel. The barrel is formed with a flange grooved on the edge adapted to receive a cord 69. The cord is attached at one end to the flange and at the other to the paper carriage. The spring 67 when permitted to uncoil winds up the cord 69 and draws forward the paper carriage. Each key lever 3 is provided as is seen in Fig. 5 with a stem 70 projecting downward from it and when the key is depressed this stem presses upon the front cross bar of a rectangular frame 71. The frame is thus caused to tip about the pivots 72 which are inserted into the base framing of the machine.

There are four frames 71 one within the other and they are all on the same pivots 72. Springs 73 are provided which support the frames 71 and which when the fore part of either of the frames is depressed by a finger key tend to raise it and when the key is released they return the frame 71 to its original position. Each frame at its rear end is connected by an adjustable rod 74 with a cam lever 75 which is free to turn about the stationary axis or stud 76. There are four of these levers 75, all on the same axis or stud and connected with the frames 71 each to each. Each cam lever 75 is engaged with a corresponding pawl carrier 77; a pin on the carrier entering a curved cam slot in the lever. The four pawl carriers 77 are mounted at their lower ends upon a stud axis 78.

It will be seen from the foregoing description that the depression of a finger key, by moving one of the frames 71 and cam lever 75 causes the corresponding pawl carrier 77 to advance toward the ratchet wheels 63. As it does so the pawl 79 which is jointed to the pawl carrier enters between the teeth of one or other of the ratchet wheels 63, namely the ratchet wheel to which it is opposite.

The pawl 79 it will be seen is supported by a spring 80 which raises it as high as an adjustable screw 81 admits. Each pawl 79 also carries a projecting pin or horn 82 and this as the pawl carrier 77 advances presses against the finger 83. The finger 83 which is parallel to the axis of the ratchet wheels, is carried by a slotted arm 84 which is fast upon the axis of the retaining pawl 65. These parts are so adjusted that on the advance of the pawl carrier 77 immediately it has entered its own pawl 79 between the ratchet teeth, the retaining pawl 65 is tripped. The paper carriage then advances and the ratchet wheels 63 turn carrying with them the engaged pawl 79 as far as it is free to move. When the pawl 79 arrives at the end of its course it stops the further movement of the ratchet wheels 63 and the paper carriage comes to rest. Just before this happens however the pin or horn 82 on the engaged pawl 79 passes beneath the finger 83 leaving the retaining pawl 65 free and immediately by the action of the spring 66, it returns and entering between the teeth of one of the wheels 63, it locks and holds them and the pawl carrier 77 may then retire without releasing the paper carriage.

On the several pawl carriers 77 the adjusting screws 81 are differently set; thus the first of the series of pawl carriers may be adjusted to permit a travel of the wheels 63 equal to one tooth of the ratchet; the next a travel of two teeth, the third a travel of three teeth and the rear pawl carrier a travel of four teeth. Thus four different grades of spacing are provided for, and the employment of the one or the other depends on the position of the projection on the finger key.

If the machine were to be always worked at a slow rate the mechanism above described would suffice for the better spacing movement of the paper carriage but in rapid working there would be danger that the carriage, if influenced simply by the spring 67 would not have completed its forward movement before the striking of the type on the paper. To provide for this the lever 85 is arranged upon the same axis with the ratchet wheels 63, it carries a horizontal arm 86 which projects over the cam levers 75 so that each lever when moved by the finger key strikes the arm 86 and moves the lever 85 around the axis 61. The lever 75 strikes upon the arm 86 immediately after the pawl carrier 77 has completed its forward movement and the pawl 79 has engaged.

The lever 85 carries a driving pawl 87 which operates in conjunction with the ratchet wheel 64; it is not however normally engaged with the teeth of the ratchet wheel but the same movement which disengages the locking pawl 65 causes the driving pawl 87 to engage the driving pawl having upon it a pin 88 which is held in the slot of the arm 84 on the axis of the retaining pawl. So it will be seen that the movement of the lever 85 serves to propel the paper carriage should it be tardy in its movement.

The cam levers 75 are of different lengths so that the lever 85 may not be moved unnecessarily far by the cam levers which operate to produce the shorter spaces. In any case however the driving pawl 87 need not operate during the whole of the movement of the lever which carries it, for when the retaining pawl 65 returns the driving pawl is thereby lifted out of gear.

90 is a finger key which operates only on the outer rectangular frame 71, by its means without printing the paper carriage can be permitted to advance one space, the longest of those provided say four teeth of the ratchet wheel. 91 is a finger key which by acting upon the innermost frame 71 in a similar way operates to release the paper carriage for a movement of one tooth of the ratchet.

92 is a hand lever which is used in spacing between words; it is pivoted at 93 supported by a reacting spring 94 and it has a finger 95 on its under side which presses upon the top of one of the rectangular frames 71 and so when depressed determines a forward movement of the paper carriage equivalent to three teeth of the ratchet wheels.

96 is a push button which is used to release the paper carriage to allow it to advance under the control of the hand. The release is effected by a cam 97 on the horizontal axis 98. An arm $a$ on this axis is connected with the rod carrying the push button and when the push button is thrust in (overcoming a light spring) the axis 98 is turned and the cam 97 presses on the arm 84 and moves it so as to lift the retaining pawl which is upon same axis with the arm.

99 is a bell supported by the guide rail 37 and adjustable in position along it. The hammer of this bell has a weighted pawl jointed to it and this is caught by a projection on the paper carriage as the carriage approaches the end of its course. The hammer is lifted by the projection and then as the carriage passes on the hammer falls on the bell thereby giving warning of the approach to the end of a line. The paper carriage is then moved back by the hand as far as the stop pin 100 permits. The projection 101 on the paper carriage comes against the stop pin and arrests the return movement of the carriage. A series of holes is provided in the stationary bar 102 into either of which the pin 100 may be inserted; thus the position to which the paper carriage is brought back may be varied as desired.

What I claim is—

1. In a type-writing machine, the combination, substantially as described, of two sets of pivoted type hammers having their fulcra arranged in two series occupying concentric arcs, the one arc exterior to the other, and with the shafts of the hammers of the one series crossing the shafts of the hammers of the other series.

2. In a type-writing machine, the combination, substantially as described, of two sets of pivoted type hammers having their fulcra arranged in two series occupying concentric arcs in different horizontal planes, and with the shafts of the hammers of the one series crossing the shafts of the hammers of the other series and corresponding slides connected with the pivoted hammers and also arranged in semi-circular series.

3. In a type-writing machine, the combination of a paper carriage, two sets of pivoted type hammers having their fulcra arranged in two nearly semi-circular and parallel series, corresponding slides connected with the pivoted hammers and also arranged in semi-circular series, two semi-circular bars (16 and 17) arranged one above the other, on which the hammers are pivoted, and semi-circular bars arranged opposite said first mentioned bars on which the heads of the hammers rest.

4. In a type-writing machine, the combination, substantially as described, of two sets of type hammers H and h, slides 10 and 11 operatively connected therewith, devices for operating the slides, the inkers 15 and 15× operatively connected with the slides, and the ink distributing surfaces from which the inkers collect their ink, such inkers and distributing surfaces being all arranged concentrically and with those appertaining to the outer series of hammers H in rear of and smaller than those appertaining to the inner series of hammers h, the organization being such that the hammers h reach their inkers by extending between and crossing the hammers H of the outer series.

5. In a type-writing machine, the combination of parts forming the joint between the slide and the hammer, viz., the pins 22 and 23, upon the hammer, and the slots 24 and 25, and the curved horn 26 upon the slide.

6. In a type-writing machine, the combination of a series of hammers and slides, the finger keys, connections between the finger keys and the slides, and a joint between each hammer and slide consisting of a curved horn 26 on the slide, and pins 22 and 23 on the hammer extending through slots 24 and 25 in the end of the slide.

7. In a type-writing machine, the combination with the carriage of a ratchet wheel operatively connected therewith, and which revolves when the carriage advances, a retaining pawl engaging with the ratchet, a series of independently operated pawls with different degrees of freedom of movement and each of which is adapted to engage with the ratchet wheel, and connections between these pawls and the finger keys.

8. In a type-writing machine, the combination of a paper carriage, a ratchet wheel operatively connected with the carriage, and which revolves as the carriage advances, a retaining pawl engaging with the ratchet, a series of independently operated pawls each of which is adapted to engage with the ratchet, devices for adjusting the position of the pawls relatively to the ratchet wheel, and means for moving the pawls into and out of engagement with the ratchet wheel.

9. In a type-writing machine, the combination, substantially as described, of a paper carriage, a series of ratchet wheels 63 connected with and actuated by the carriage, a series of pawl carriers 77, connected with and actuated by the finger keys, a series of pawls 79, having different degrees of freedom of movement, horns 82, on the pawls, a retaining pawl 65, and a finger 83 actuated by the horns to lift the retaining pawl.

10. In a type-writing machine, the combination, substantially as described, of a paper carriage, a ratchet wheel connected with and operated thereby, a retaining pawl, a series of independently operated pawls adapted to engage with the ratchet wheel, and to limit its movement when the retaining pawl is released, means for actuating the said last mentioned pawls, a finger connected with the retaining pawl, and horns on the other pawls adapted to engage with said finger to lift the retaining pawl.

11. In a type-writing machine, the combination of the carriage, the finger keys, the ratchet wheel operatively connected with the carriage and which rotates as the carriage advances, the retaining pawl 65, means for lifting the retaining pawl, devices for limiting the movement of the ratchet when the retaining pawl is released, a driving pawl 87 coupled with the retaining pawl 65, and means for lifting the retaining pawl and actuating the driving pawl to positively move the ratchet.

12. In a type-writing machine, the combination of a paper carriage, a ratchet wheel connected with and rotated by the carriage, a retaining pawl engaging with the ratchet, a lever 85, connections between the lever and the finger keys, a driving pawl 87, connected with and operated by said lever, and connected with the retaining pawl, the organization being such that when the retaining pawl is released the driving pawl positively moves the ratchet.

ALFRED HENRY HUTH.

Witnesses:
W. PERCY CARPMAEL,
DEANSTON CARPMAEL.